(12) United States Patent
Vela et al.

(10) Patent No.: US 9,232,413 B2
(45) Date of Patent: Jan. 5, 2016

(54) MAINTAINING HIGH SIGNAL QUALITY IN MOBILE WIRELESS NETWORKS USING SIGNAL RELATIVE IMPORTANCE VALUES

(71) Applicant: United States Cellular Corporation, Chicago, IL (US)

(72) Inventors: Mario Vela, Knoxville, TN (US); Michael Shannon Irizarry, Barrington Hills, IL (US); Narothum Saxena, Hoffman Estates, IL (US)

(73) Assignee: United States Cellular Corporation, Chicago, IL (US)

( * ) Notice: Subject to any disclaimer, the term of this patent is extended or adjusted under 35 U.S.C. 154(b) by 419 days.

(21) Appl. No.: 13/875,841

(22) Filed: May 2, 2013

(65) Prior Publication Data

US 2014/0328188 A1    Nov. 6, 2014

(51) Int. Cl.
*H04W 24/02* (2009.01)
*H04W 36/00* (2009.01)

(52) U.S. Cl.
CPC .......... *H04W 24/02* (2013.01); *H04W 36/0083* (2013.01)

(58) Field of Classification Search
CPC ..... H04W 24/02; H04W 24/08; H04W 36/24; H04W 16/18; H04W 16/32; H04W 24/00; H04W 24/04
USPC .............. 455/422.1, 423, 436, 437, 446, 449; 370/252.328, 331, 332, 252, 328
See application file for complete search history.

(56) References Cited

U.S. PATENT DOCUMENTS

| | | |
|---|---|---|
| 5,513,263 A | 4/1996 | White et al. |
| 6,236,365 B1 | 5/2001 | LeBlanc et al. |
| 6,940,838 B1 | 9/2005 | Stead |
| 6,952,181 B2 | 10/2005 | Karr et al. |
| 6,957,069 B2 | 10/2005 | Shah et al. |
| 7,207,024 B2 | 4/2007 | Scheffer |
| 7,298,327 B2 | 11/2007 | Dupray et al. |
| 7,395,056 B2 | 7/2008 | Petermann |
| 7,453,826 B2 | 11/2008 | Wildfeuer et al. |
| 7,509,131 B2 | 3/2009 | Krumm et al. |
| 7,525,484 B2 | 4/2009 | Dupray et al. |
| 7,551,921 B2 | 6/2009 | Petermann |
| 7,599,323 B2 | 10/2009 | Chandranmenon et al. |
| 7,729,711 B2 | 6/2010 | Brabenac |
| 7,764,231 B1 | 7/2010 | Karr et al. |
| 7,812,766 B2 | 10/2010 | Leblanc et al. |

(Continued)

*Primary Examiner* — Magdi Elhag
(74) *Attorney, Agent, or Firm* — Leydig, Voit & Mayer, Ltd.

(57) ABSTRACT

A computer-automated method is described for identifying and carrying out reconfiguration actions for a transmitter in a radio network. A computer system is configured to determine, for a first transmitter, a multitude of relative importance values for signal data points relating to the first transmitter, the signal data points being acquired by mobile wireless devices from the first transmitter. Each relative importance value is determined by: (1) calculating a relative relevance for a first signal data point for the first transmitter, acquired by a first mobile wireless device, by comparing a first value for the first signal data point to a second value for a second transmitter, (2) calculating, by a fuzzy logic engine, a quality for the first signal data point, and (3) rendering a relative importance value based upon the relative relevance and the quality for the first signal data point. The results are thereafter used to carry out a reconfiguration action upon at least one transmitter based upon the multitude of relative importance values.

23 Claims, 6 Drawing Sheets

(56) References Cited

U.S. PATENT DOCUMENTS

| | | |
|---|---|---|
| 7,936,872 B2 | 5/2011 | Krumm et al. |
| 8,032,153 B2 | 10/2011 | Dupray et al. |
| 8,098,590 B2 | 1/2012 | Catovic et al. |
| 2009/0124262 A1* | 5/2009 | Vela et al. ............ 455/442 |
| 2009/0310501 A1* | 12/2009 | Catovic et al. ........ 370/252 |
| 2011/0255514 A1* | 10/2011 | Olofsson et al. ...... 370/331 |
| 2013/0028107 A1* | 1/2013 | Ho et al. ............... 370/252 |
| 2013/0090126 A1* | 4/2013 | Xing et al. .......... 455/452.1 |
| 2014/0111517 A1* | 4/2014 | Vela et al. ............. 345/440 |

* cited by examiner

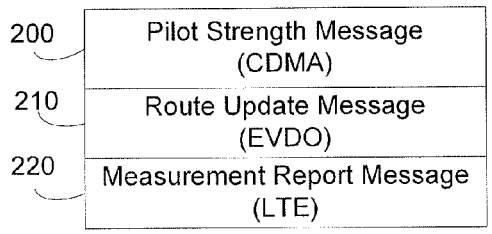
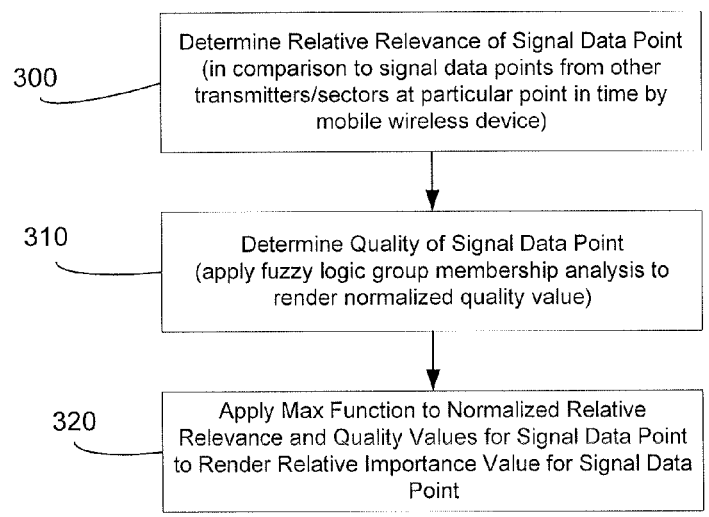
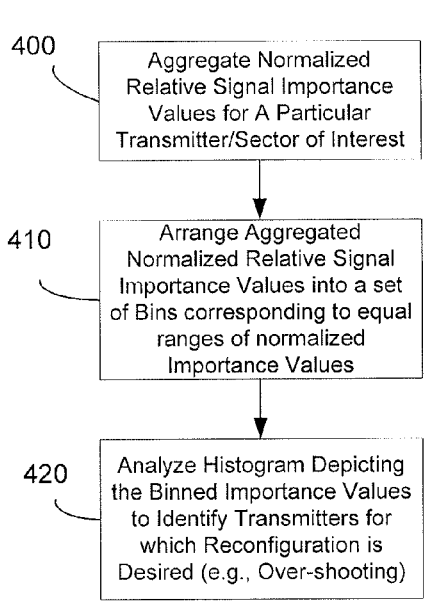
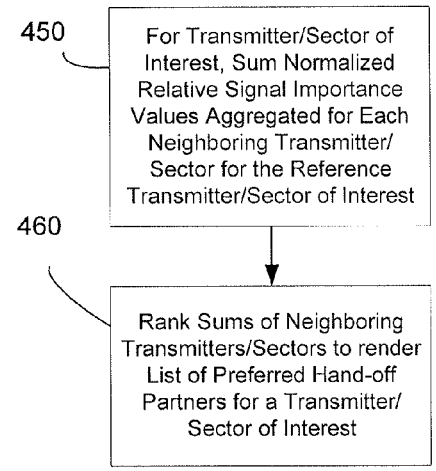
FIG. 4A
FIG. 4B

For PN1:
Delta1 = $Ec/Io_{PN2}$ - $Ec/Io_{PN1}$ = -6 – (-10) = +4
Delta2 = $Ec/Io_{PN3}$ - $Ec/Io_{PN1}$ = -13 – (-10) = -3

For PN2:
Delta1 = $Ec/Io_{PN1}$ - $Ec/Io_{PN2}$ = -10 – (-6) = -4
Delta2 = $Ec/Io_{PN3}$ - $Ec/Io_{PN2}$ = -13 – (-6) = -7

For PN3:
Delta1 = $Ec/Io_{PN1}$ - $Ec/Io_{PN3}$ = -10 – (-13) = +3
Delta2 = $Ec/Io_{PN2}$ - $Ec/Io_{PN3}$ = -6 – (-13) = +7

| Num PN | dB correction |
|---|---|
| 6 | 0 |
| 5 | 0.1 |
| 4 | 0.3 |
| 3 | 0.75 |
| 2 | 1 |

FIG. 7 dB Corrected Deltas
For PN1
Delta1 = 4 -0.75 = 3.25
Delta2 = -3 -0.75 = -3.75

For PN2
Delta1 = -4-0.75 = -4.75
Delta2 = -7-0.75 = -7.75

For PN3
Delta1 = 3-0.75 = 2.25
Delta2 = 7-0.75 = 6.25

FIG. 8

Logit Transformation weights:
For PN1
Delta1 = 4 -0.75 = 3.25 -> weight = 0.96
Delta2 = -3 -0.75 = -3.75 -> weight = 0.02

For PN2
Delta1 = -4-0.75 = -4.75 -> weight = 0.01
Delta2 = -7-0.75 = -7.75 -> weight ~ 0

For PN3
Delta1 = 3-0.75 = 2.25 -> weight = 0.9
Delta2 = 7-0.75 = 6.25 -> weight ~ 1

FIG. 9

MAINTAINING HIGH SIGNAL QUALITY IN MOBILE WIRELESS NETWORKS USING SIGNAL RELATIVE IMPORTANCE VALUES

FIELD OF THE INVENTION

This invention relates generally to the field of mobile wireless communications networks. More particularly, the invention is directed to maintaining radio transmitter components supporting data communications in mobile wireless (e.g., cellular) networks.

BACKGROUND OF THE INVENTION

Changes in usage patterns by customers of mobile wireless communications services, with an increased emphasis on smart phone-based data traffic as opposed to voice, have placed unprecedented demand upon underlying physical network infrastructures that support such services. Proliferation of smart phones, and their subsequent use to carry out high volume/data-rate communications—including streaming video transmissions—has resulted in exponential growth in the volume of data flowing over wireless networks. The substantial increased data transmission volume via existing physical networks is challenging the capabilities of the infrastructure to a degree that was not contemplated when mobile wireless services were primarily used to support voice communications. The increased volume of data communications presents a challenge for service providers who must ensure reliable mobile wireless service for most, if not all, users.

One area of mobile wireless network service optimization involves the transmitter components of the radio network. In particular, substantial resources are dedicated to ensuring proper radio signal quality, in particular a signal-to-noise ratio for radio transmissions (SNR), from cell towers on a sector-by-sector basis. Such radio network maintenance is facilitated by mobile wireless devices routinely acquiring SNR data and reporting the SNR data on a routine basis to respective service provider servers. This vast quantity of signal quality (e.g., SNR) data is mined and processed by the service providers to identify radio transmitters requiring remedial measures (e.g., adjustment of signal transmission power) to improve the signal quality (e.g., SNR) for a particular sector from which a high number of mobile wireless devices have reported low SNRs.

When carrying out remedial actions to counter frequent identification of a particular transmitter/sector having a low SNR, the intuitive response is to improve the signal having a low signal-to-noise ratio (SNR) by increasing the power of the transmission. However, counter-intuitively, such action may result in even more instances of mobile wireless devices reporting a low SRN for transmissions by the particular transmitter/sector. Such is the case where the transmitter/sector is over-reaching. In other words, the transmitter/sector is being identified as present in geospatial locations that are well-covered by closer, more appropriate, radio towers. This phenomenon is referred to as "over-reaching" by a particular transmitter/sector. In such instances the preferable action taken to reduce the power of the over-reaching transmitter to reduce/eliminate its detection by mobile wireless devices in regions handled in a satisfactory manner by other transmitters. The challenge is thus to reliably distinguish between instances of compiled mobile wireless SNR data indicative of a need to increase transmission signal power and SNR data indicative of over-reaching transmissions where the proper remedy is possibly to reduce power of the transmitter.

SUMMARY OF THE INVENTION

The above challenge of deciding whether a need for remedial action or tuning (e.g., modifying power/tilt, updating a neighbor transmitter preference ranking), on a particular transmitter/sector basis, is addressed by pre-processing signal (e.g. SNR) data points received from multiple mobile devices to render a multiplicity of relative importance values corresponding to the signal data points. During the pre-processing a relative importance value for a particular signal data point (in relation to other signal data points acquired for other sectors/transmitters at the same location) is calculated for each signal (e.g., SNR) data point. The relative importance value for each signal is based upon: (1) a signal relative relevance and (2) signal quality. By way of example, an importance value for a signal data point is a maximum of the normalized value for: (1) the signal relevance and (2) signal quality. Thereafter, the relative importance values for individual signals are aggregated and further processed to modify a current configuration of a transmitter/sector in need of remedial action and/or tuning.

In a first example of further processing of the relative importance values rendered during the pre-processing, a histogram, comprising a set of bins corresponding to ranges of importance values for the signal data points for the particular transmitter/sector, is created based upon the assigned data point relative importance values. An "over-reaching" (or "under-reaching") transmitter/sector is identified by analyzing a dispersion pattern of instances of the relative importance values in the histogram bins. In a particular example, an over-reaching transmitter is characterized by a histogram having a pronounced concentration of points around the lowest "importance" ratings (e.g. importance rating value <0.5 in a normalized importance scale from 0 to 1). Conversely, an "under-reaching" transmitter/sector is characterized by a histogram having a pronounced concentration of points around the highest "importance" ratings (e.g. importance rating value >0.7). Histogram analysis programs can be used that apply "over-reaching" and "under-reaching" histogram criteria to render a listing of candidate transmitters/sectors that may benefit from re-configured or modified to address the identified over/under-reaching signal issue. In a particular closed loop programmed controller arrangement, such re-configuration may be performed based upon commands issued by a programmed closed-loop controller, and the results of such re-configuration are evaluated by the closed-loop controller by observing resulting new histograms generated from signal data points obtained after carrying out remedial re-configuration with regard to the identified under/over-reaching transmitters/sectors.

In a second example of further processing of the relative importance values rendered during pre-processing, each relative importance value is associated with a "reference" transmitter that differs from the transmitter for which the relative importance value is generated during pre-processing. Relative importance values, for a neighboring transmitter/sector of a transmitter/sector of interest, derived from messages identifying the transmitter/sector of interest as the reference transmitter, are aggregated to render a sum of relative importance values. The sums of all neighboring transmitters/sectors of the transmitter/sector of interest are thereafter ranked by summed value in a listing of preferred hand-off partners for the reference transmitter.

Embodiments of the invention are used to provide a method, non-transitory computer readable medium, and a radio network infrastructure monitoring/maintenance computer system configuration facilitating and performing operations for computer-automated identification and remediation of non-optimal power levels in particular transmitters in a mobile wireless radio interface infrastructure associated with cellular network towers.

More particularly, examples are described herein of a method (also computer-readable medium and configured computer system) for identifying and carrying out reconfiguration actions for a transmitter in a radio network. The method comprises determining, for a first transmitter, a multitude of relative importance values for signal data points relating to the first transmitter, the signal data points being acquired by mobile wireless devices from the first transmitter. Each relative importance value is determined by: (1) calculating a relative relevance for a first signal data point for the first transmitter, acquired by a first mobile wireless device, by comparing a first value for the first signal data point to a second value for a second transmitter, (2) calculating, by a fuzzy logic engine, a quality for the first signal data point, and (3) rendering a relative importance value based upon the relative relevance and the quality for the first signal data point. The method further includes carrying out a reconfiguration action upon at least one transmitter based upon the multitude of relative importance values.

BRIEF DESCRIPTION OF THE DRAWINGS

While the appended claims set forth the features of the present invention with particularity, the invention and its advantages are best understood from the following detailed description taken in conjunction with the accompanying drawings, of which:

FIG. 2 is an exemplary set of message source types from which signal (e.g., SNR) data points are acquired from a multitude of mobile wireless devices at various geospatial locations, stored, processed and analyzed for purposes of generating and analyzing signal importance values associated with a particular transmitter/sector in exemplary systems;

FIG. 3 is a flowchart summarizing a set of steps for carrying out a method of generating a relative importance value for a particular signal data point provided by a mobile wireless device;

FIG. 4A is a flowchart summarizing an exemplary set of steps performed on a multitude of signal relative importance values rendered for a particular transmitter/sector in a mobile wireless cellular radio network to determine whether the particular transmitter/sector power level needs to be adjusted;

FIG. 4B is a flowchart summarizing an exemplary set of steps performed on a multitude of signal data point relative importance values rendered for a particular reference/non-reference transmitter/sector pair to establish a ranking of neighboring transmitters/sectors of a transmitter/sector of interest for purposes of hand-off from the sector of interest;

FIG. 7 depicts a dB correction table used to adjust calculated deltas based upon a number of data point signal sources for which delta values are calculated in accordance with exemplary systems;

FIG. 8 depicts dB corrections to deltas as a result of applying the dB correction table of FIG. 7 to the initial deltas rendered in FIG. 6;

FIG. 9 depicts normalized (0 to 1) relative relevance values rendered by applying a logit function to the dB corrected deltas rendered in accordance with the example depicted in FIG. 8;

DETAILED DESCRIPTION OF THE DRAWINGS

Figure 1:
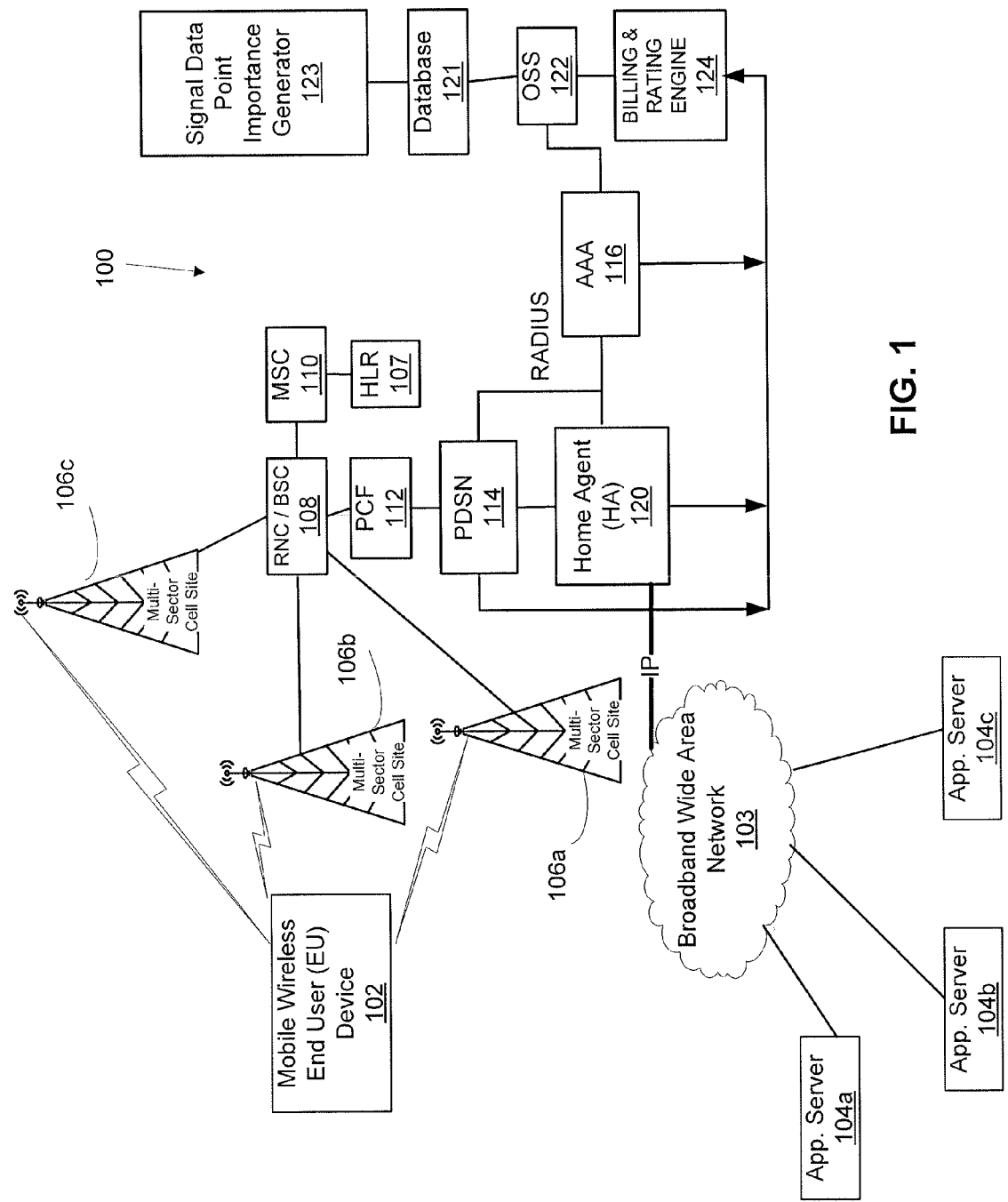
FIG. 1 is a schematic diagram illustrating a mobile wireless data network environment including a mobile wireless radio network interface including multiple transmitters, arranged as cell sites in a cellular network, providing a radio signal interface to a multitude of mobile wireless devices.

Exemplary embodiments of the invention described herein acquire and process a multitude of mobile wireless data network radio signal (e.g., SNR) data points to render maintenance decisions regarding radio signal transmitters (e.g., decrease power, adjust tilt, rotate, rank neighboring transmitters/sectors of a transmitter/sector of interest for hand-off etc.) based upon further processing of an aggregated set of relative importance values calculated from signal (e.g. SNR) data points acquired by mobile devices. During pre-processing of the signal data points, the relative importance is derived, on a signal data point-by-point basis from calculated relative relevance and quality values for individual signal data points. Thereafter, further processing results in identification of particular re-configuration operations/actions to be performed with respect to particular individually identified transmitters/sectors.

The importance values are aggregated and processed to render re-configuration decisions regarding particular transmitters/sectors in a radio interface for a cellular network. For example, the relative importance values are aggregated for a given transmitter/sector in the form of a histogram representing the number of recorded (counted) instances of relative importance values for the particular transmitter/sector that fall within particular relative importance value ranges (bins).

Alternatively, signal data point relative importance values are aggregated on a reference/non-reference transmitter pairing basis for neighboring transmitters/sectors of a transmitter/sector of interest identified as the reference transmitter/sector in messages from which the signal data point is obtained. Such relative importance values are summed based on neighboring non-reference transmitters to render a ranked set of preferred hand-off partners. Each summation corresponds to one of the set of neighboring transmitters/sectors for the transmitter/sector of interest.

The signal importance calculation and aggregate signal data point importance analysis system described herein identifies, for re-configuration and/or power adjustment, correctable transmitter/sector configurations (including rankings of potential handoff partners for a transmitter). Such identification of correctable configurations is carried out in an automated manner to render transmitter/sector re-configuration proposals that are thereafter applied to particular identified transmitters/sectors within a radio network.

The approach described herein accounts for both: (1) comparative strength of each one of a set of signals received at a single location and point in time by a mobile wireless device from separate transmitters/sectors, and (2) an absolute strength rendered by fuzzy logic analysis. In addition, the automated signal data point analysis and re-configuration identification processes are also suitable under other circumstances and might benefit other areas of mobile wireless data network service providers in need of an automated process that detects and corrects undesirable configuration of one or more radio transmitters/sectors.

Turning to FIG. 1, an exemplary network environment is schematically depicted that includes monitoring and management components facilitating acquiring and processing a variety of radio signal performance data, including SNR data points acquired by mobile wireless devices from multiple transmitters/sectors, in accordance with the aforementioned mobile wireless signal data point acquisition and analysis functionality. The illustrative embodiment includes a mobile wireless network system 100 that incorporates, by way of example, CDMA2000 based mobile wireless network components (e.g., AAA service for performing user authentication and providing user profiles) and includes data services delivered via one or more data access protocols, such as EV-DO, EV-DV or the like. Other embodiments include a wireless access network complying with one or more of LTE, WCDMA, UMTS, GSM, GPRS, EDGE, Wi-Fi (i.e., IEEE 802.11x), Wi-MAX (i.e., IEEE 802.16), or similar telecommunication standards configured to deliver voice and data services to mobile wireless end user devices such as, a mobile wireless device 102 depicted in FIG. 1 carrying out wireless communications via a radio interface provided by base transceiver stations (cell sites) such as base stations 106a, 106b and 106c. While only three base stations 106a, 106b and 106c are depicted in FIG. 1, the mobile wireless network system 100 includes hundreds of such stations per radio network controller/base station controller (RNC/BSC) 108 and, therefore, thousands of such stations per operator network. The scaling of base stations within the network continues to grow as smaller base station solutions continue to emerge through wireless innovation. (i.e., picocells, femtocells, hotspot solutions, etc). Each of the base stations is capable of acquiring thousands, even millions, of signal data points during a period of observation used to develop a radio network maintenance plan and/or render a plan for reconfiguring.

The mobile wireless network system 100 provides mobile wireless data network services via the base stations 106a, 106b, and 106c to the mobile device 102. The mobile device 102 is any of a variety of devices including, for example: a mobile phone, a PDA, or a mobile computer (e.g., a laptop, notebook, notepad, tablet, etc.) having mobile wireless data communication capability.

As noted above, the mobile wireless system 100 includes a plurality of base stations, such the base stations 106a, 106b and 106c. The base stations 106a, 106b and 106c, by way of example, include radio bearer resources and other transmission equipment necessary for wireless communication of information between the mobile device 102 and other network elements. The base stations 106a, 106b and 106c include one or more transceiver-antenna combinations. In the case of sectorized base stations, two or more transceiver-antenna combinations (hereinafter referred to as transmitters or sectors) are provided to cover particular parts of an area (actually a volume of space, discrete coding scheme, or sinusoidal phase offset). A typical arrangement for a cellular communications base station is a tri-sector arrangement where three static areas are arranged in carefully engineered "n" degrees of rotational displacement from one another. Base stations, such as base stations 106a, 106b, and 106c, come in a variety of forms, and there is no intention to limit the scope of the invention to any particular arrangement. More generally, there is no intention to limit the invention to the exemplary environment schematically depicted in FIG. 1 since the described management system and scheme for detecting problematic cell sites (base stations) and the specific problematic sectors within the cell sites, applies to other types of wireless communications systems including, without limitation, 3GPP2, EVDO and LTE based mobile wireless network systems.

The mobile wireless network system 100 is, in turn, connected to a broadband wide area network 103. The broadband network 103 provides digital data connectivity to a variety of application servers 104a, 104b, and 104c. The application servers 104a, 104b, and 104c are representative of millions of application server systems (both in-service operator network servers and out-of-operator network servers) providing a variety of Web-based services via the Internet.

Turning attention to particular components of the mobile wireless system 100, where logical connections are identified by connection lines (not necessarily representing the physical links through which identified components communicate), a home location register (HLR) 107 provides services for authenticating an identity of the mobile device 102 prior to permitting access to radio access network resources of the mobile wireless system 100. The HLR 107, by way of example, maintains a database of subscribers to the mobile wireless system 100. Each individual subscriber (e.g., each distinctly identified mobile device) entry includes a Mobile Identification Number (MIN) and/or Electronic Serial Number (ESN).

Moreover, for each data access network, radio access network resources are used to control the radio interface aspect of the mobile wireless system 100 that includes the plurality of base stations. Control of the radio interface of the base station 106 within the system 100 is carried out, for example, by a radio network controller (RNC) or a base station controller (BSC), identified in FIG. 1 as RNC/BSC 108. The RNC/BSC 108 manages the radio traffic between neighboring ones of a plurality of base stations such as the base station 106. Such management of radio traffic includes controlling handoff between sectors and/or base stations.

Additionally, the mobile wireless system 100 illustratively depicted in FIG. 1 includes a mobile switching center (MSC) 110. The MSC 110 manages voice calls placed in and out of the mobile wireless system 100.

Continuing with the illustrative schematic depiction of the wireless network 100, a packet control function (PCF) 112 is communicatively coupled to the RNC/BSC 108. The PCF 112 carries out the function of routing data packets from the RNC/BSC 108 to one of a set of PDSNs. The RNC/BSC 108 is, by way of example, collocated with a packet control function (PCF) 112. It is noted that in the illustrative example, the system 100 is depicted as having a single packet data serving node (PDSN)—i.e., PDSN 114, and in such instance the PCF 112 is not needed to perform the aforementioned routing to a particular one of multiple PDSNs. However, in cases where a wireless system comprises multiple PDSNs, the PCF 112 selectively routes data packets received from the RNC/BSC 108 to an appropriate one of the set of PDSNs for further processing.

The illustrative mobile wireless system 100 includes one or more services (implemented in the form of computer executable instructions carried out by processors on one or more physical server machines) that authenticate and determine/designate access rights for particular identified entities prior to granting access to the mobile wireless system 100's data network transmission services. In the exemplary embodiment, such authentication services are provided by an accounting authentication authorization (AAA) service 116.

The AAA service 116 carries out the task, during set up of a session for an identified subscriber, of ensuring that the subscriber associated with the mobile device 102 is allowed to use the data resources of the system 100. After initially confirming the authenticity of the identified user seeking to establish a user session, the AAA service 116 provides a response including a profile for the identified user including, among other things, user permissions. The permissions can be implicit—e.g., the user is identified as belonging to a particular group—or explicitly listed in the profile assigned to the system.

Upon completion of the user authorization process for the use of data resources, via the PDSN 114 and AAA service 116, a home agent (HA) 120 forwards an IP address, received from the AAA server 116, to the PDSN 114. The PDSN 114, in turn, forwards the IP address to the mobile device 102. In the illustrative example, the HA 120 is a router located on a home network of the mobile device 102. The HA 120 tunnels packets from the home network to the mobile device 102 when the mobile device 102 is roaming.

An Operating Support System (OSS) 122 serves as a central point for administration, management, and provisioning of all network elements. Among other things, the OSS 122 administers the individual accounts of subscribers that use the mobile wireless system 100—including specifying the profile values that determine permissions for users associated with the account with which the mobile device 102 is associated. In accordance with an illustrative embodiment, the OSS 122 collects raw performance signal parameter data point (e.g., SNR) sets from any of a variety of mobile wireless data network components, including base stations, gateways, etc. to facilitate automated performance of the transmitter/sector signal analysis and maintenance procedures described herein. With reference to FIG. 1, such information is received, for example, from the mobile wireless device 102 via the RNC 108. To ensure availability of the OSS 122 resources for other management functions, the OSS 122 stores the received signal parameter data point sets in a signal data point set database repository 121. While the information stored in the database 121 is stored via the OSS 122 in the illustrative example, it is expressly noted that in alternative embodiments, such information is acquired/transported/stored via alternative network entities. In one particular alternative arrangement the signal data point information acquired by mobile wireless devices, from which normalized importance values are rendered, is passed from the RNC/BSC to the signal data point database repository 121 without passing through the OSS 122.

Also, the manner in which such information is acquired varies in accordance with various embodiments including, for example, simple network management protocol (SNMP) polling by a networked server separate from the OSS 122. Such arrangement is particularly valuable in physical network arrangements comprising multiple OSS nodes handling network equipment provided by different vendors. In that case, the database repository 121 operates as a central storage location for all acquired/processed network performance parameter data used to carry out transmitter/sector importance calculations and thereafter storing such information for determination of whether reconfiguration of any radio interface transmitters/sectors are in need of reconfiguration.

An application server 123, configured to incorporate both signal data point set analysis and identification of problematic transmitters/sectors (e.g., ones that are over-reaching and thus needing to have a lowered transmission power), retrieves the stored raw data point sets from the database repository 121. The application server 123 includes signal data point set processing (see, FIGS. 3 and 4 described herein below) components for detecting poorly performing radio transmitters/sectors in the interface between the cellular network and mobile wireless devices based upon the signal data point sets stored in the database repository 121.

Furthermore, in accordance with an exemplary embodiment, the mobile wireless system 100 further includes a billing and rating engine 124. As indicated in FIG. 1, the billing and rating engine 124 is a back office system that is configured to receive certain information, based upon subscriber usage information received from other components of the system 100. The billing and rating engine 124 communicates such information to the OSS 122. By way of example, the billing and rating engine 124 monitors information provided by the HA 120 indicating a particular mode within which the mobile device 102 is (or has been) operating—as well as the quantity of data passed by the mobile device 102 while operating in the indicated mode. The billing and rating engine 124 issues a notification to the OSS 122 that the mobile device 102 is (or has been) operating in a particular mode. The indicated particular operational mode of operation sent to the OSS 122, if not permitted under the current user profile for the mobile device 102, initiates immediate and/or delayed responsive actions by the mobile wireless system 100 to ensure that the mobile device 102 operates in accordance with the terms of a current user agreement.

As those of ordinary skill in the art will realize, the foregoing network elements of the mobile wireless system 100 are implemented via telecommunications equipment having one or more computer processors, as well as non-transitory computer readable media, such as RAM/ROM, solid-state memory, and/or hard drive memory and the like, which store computer executable instructions for executing embodiments of the methods described in further detail below.

Turning to FIG. 2, an exemplary set of mobile wireless signal (e.g., SNR) data information types are provided that support the operation of the radio interface (e.g., transmitter/sector) diagnostic system described herein. Data point analysis and production of results, in the form of histogram data, revised neighbor lists for a transmitter/sector of interest, and/or recommended re-configuration instructions/operations for identified radio transmitters/sectors is carried out on the database 121 and the application server 123 comprising programmed processing hardware for pre-processing electronic signal (e.g., SNR) data points provided by the mobile wireless devices after receiving the types of mobile wireless signal data identified, by way of example, in FIG. 2.

The information types identified, by way of example, in FIG. 2 are all type of SNR data. A Pilot Strength Message 200 is a known message bearing SNR information (including an identification of a reference transmitter) in CDMA (1×) mobile wireless networks. A Route Update Message 210 is a known message bearing SNR information in EV-DO mobile wireless networks. A Measurement Report Message 220 is a known message bearing SNR information in LTE mobile wireless networks. By way of example, signal data points corresponding to the information types summarized in FIG. 2 are received from mobile wireless devices and forwarded through the RNC 108 (eventually) to the OSS 122. An exemplary data format for received data points include a timestamp (time period, such as a date and hour within which the data was acquired) and network element ID (identifying a source of the data), a data type identifier, and a data point value. The SNR measurement information can be grouped according to timestamp (for measurement data that is acquired a substantially the same time and place—though the location of the mobile wireless device at the time of acquisition is not necessarily known). It is noted that the above-identified signal information types are not intended to be limiting as other current and future signal strength (e.g., SNR) messages are contemplated in alternative implementations.

The above identified signal information, acquired by multiple mobile wireless devices operating at multiple locations over multiple points in time, are aggregated and analyzed over many (statistically significant) signal data points for a particular mobile wireless base station radio transmitter/sector (or pair of transmitters/sectors—one being a reference transmitter/sector) to render a set of signal relative importance values. The relative importance values are thereafter arranged, in a first example, in a set of importance value bins making up a histogram for a given transmitter/sector. In a second example, pair-wise aggregation is performed to render/reconfigure a ranked listing of hand-off neighbors for a transmitter/sector of interest. A collection of such data points would generally number at least in the thousands and would ideally number in the hundreds of thousands or even millions to ensure statistical relevance.

The application server 123, whose operation is summarized in FIGS. 3, 4A and 4B, and the associated written description herein below, operates upon the acquired signal (e.g. SNR) data points to render sets of normalized relative importance values for individual radio transmitters/sectors in accordance with the operations summarized in FIG. 3 for processing a single signal data point. Thereafter, the further processing steps of FIGS. 4A and 4B are performed on particular aggregated sets of the normalized importance values rendered for a single radio transmitter/sector to identify a potentially correctable configuration. In a first example summarized in FIG. 4A, the aggregated sets are used to prepare a histogram, and thereafter analyze the relative counts of relative importance values within individual bins of the histogram (the histogram profile) to render a maintenance decision with regard to individual radio transmitters/sectors. In a second example summarized in FIG. 4B, the aggregated sets, grouped according to a reference/non-reference transmitter/sector pair, are summed for purposes of rendering a cumulative weight for the non-reference neighboring transmitter/sector. Such cumulative weights are determined for a set of neighboring transmitters/sectors for the transmitter/sector of interest to establish a ranked listing of preferred hand-off partners for the transmitter/sector of interest.

Turning to FIG. 3, a flowchart provides a summary of a set of operations carried out on a repeated basis by systems, such as the ones described herein above with reference to FIGS. 1 and 2, to render a computer-generated sets of signal relative importance histogram data on an individualized base station transmitter/sector basis. Before describing the details of the steps set forth in FIG. 3, generating a relative importance value is generally characterized by a three-step procedure including:

(1) At step 300, generating a normalized relevance value specifying a relative relevance of particular signal (SNR) data point with respect to a value of another signal data point received by the mobile wireless device 102 at a same point in time (and implicitly same location) from multiple transmitters/sectors corresponding to signals received from the base stations 106a, 106b, and 106c. Relevance is a metric describing how much better (or worse) a particular signal (SNR) data point for a particular transmitter/sector of a base station (e.g. base station 106a) is in relation to signal data points obtained at the same point in time (and thus implicitly the same geospatial location) for transmitters/sectors for other base stations (e.g., base stations 106b and 106c). The relative relevance is further affected by the number of signal sources (transmitters/sectors) registered at a particular point in time (location) by the mobile wireless device. As a result, the normalized relative relevance tends to increase when the number of signal sources is low. This adjustment ensures against eliminating a signal source in a spot with coverage by a small number (e.g. 2) of transmitters/sectors.

(2) At step 310, generating a normalized quality value specifying an absolute quality value for the particular signal (SNR) data point (for which a relative relevance is determined in the above-described step (1)) that does not require any comparison to signal point values received from other transmitters. One way to assign normalized quality values is to assign a value based upon a standard/table relating received signal data point values to corresponding normalized quality values. However, the relationship between a particular data point value and a corresponding normalized quality value is subjective and may vary based upon the engineer(s) specifying the standard and/or the particular radio technology being used (since some technologies have better noise immunity than others and thus do not require as high SNRs to provided a high level of signal quality). In recognition of the subjective/contextual nature of assigning normalized quality values to signal data points, fuzzy logic processing is incorporated into determining a normalized quality value for signal data points.

(3) At step 320, determining a relative importance of the signal data point by applying a function to: the normalized relative relevance value (rendered during step 300); and the normalized quality value (rendered during step 310) for the signal (e.g., SNR) data point. By way of example, the function is a "MAX" function that takes the larger normalized value of the two normalized values for the signal data point rendered during steps 300 and 310. The steps 300 and 310 for generating normalized relevance and quality values, which can occur in any order, are described in detail using particular examples herein below.

During step 300, a normalized relative relevance value is generated for the data point. The normalized relative relevance for the signal data point is calculated by taking the deltas (individual signal data point differences) of the signal data points (e.g., Ec/Io, SINR, dBm) acquired as a single group (i.e. same time and thus location), wherein the relative relevance values for all signal data point of the single group are adjusted for the number of transmitters/sectors represented in the single group, the result is thereafter normalized (e.g., converted into a range of 0 to 1 using a logit transformation). The objective of the procedure during step 300 is to assign a higher metric value (closer to 1 in a normalized relative relevance range of 0 to 1) to the more relevant signal data points (i.e., ones that are better in the measured aspect to other signal data points in a group).

Figures 5, 6:
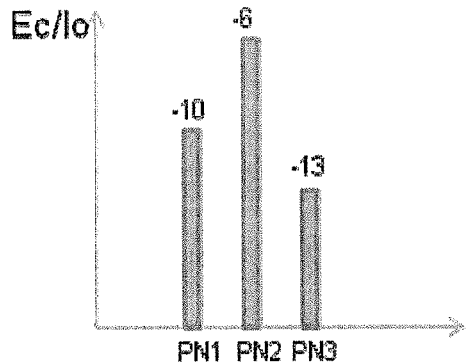
FIG. 5 depicts a set of three signal data points received by a mobile wireless device for processing in accordance with an illustrative example of exemplary systems.
FIG. 6 depicts calculations performed on the set of three received signal values of FIG. 5 to render six delta values indicative of relative relevance of each of the three signal data points in the set.

FIG. 5 displays a set of Ec/Io signal values PN1, PN2 and PN3, acquired by the mobile wireless device 102 in a CDMA 1× network from transmitters/sectors 106a, 106b and 106c respectively. In this particular signal quality message, PN1 is −10 dB, PN2 is −6 dB, and PN3 is −13 dB. First, the relative signal value deltas (differences) are calculated for each signal point value. The calculations for the deltas, generated from the values provided in FIG. 5, are depicted in FIG. 6.

Turning to FIG. 7, a dB correction chart identifies the correction applied to each delta calculation (depicted in FIG. 6) based upon the number of distinct transmitters/sectors for which deltas are being calculated. The correction (subtraction from the calculated deltas) tends to increase the relevance of each transmitter in the group as the number of transmitters is reduced. This has the effect of reducing the possibility of identifying a signal as being of low relevance when a relatively small number of transmitters are represented in a signal group for which deltas are calculated. It is noted that relative importance can only be applied (deltas calculated) if at least two distinct transmitters are present. Thus, the lowest number of transmitters in the table is two. On the other hand, the table ends at six transmitters since, in this particular example, no dB correction is applied in cases where the number of transmitters is six or greater. In the illustrative example in FIG. 6, three distinct transmitters are represented in the delta calculations, and therefore each delta value is reduced by 0.75 (per the table). The dB correction values generally decrease as the number of distinct transmitters increase. The resulting corrected deltas are provided in FIG. 8.

Next, the processing of the dB corrected deltas continues by transforming each corrected delta value (see, FIG. 8) to a normalized weight value between 0 and 1 using the known logit transformation (equation 1) as follows:

$$\text{weight} = \frac{e^{delta}}{1 + e^{delta}} \quad \text{(equation 1)}$$

The resulting weight values are represented in the table 1 provided herein below.

TABLE 1

| Weight | Ec/Io delta |
|---|---|
| 0.00 | −inf |
| 0.10 | −2.197 |
| 0.30 | −0.847 |
| 0.50 | 0.000 |
| 0.70 | 0.847 |
| 0.90 | 2.197 |
| 1.00 | +inf |

Applying the logit transformation to the values depicted in FIG. 8 results in the set of corresponding weights for the corrected dB delta values depicted in FIG. 9. The relative relevance (the value of interest in calculating the "importance" of a signal data point) is complimentary to the "weight" rendered by applying the logit transformation to the dB corrected deltas. Thus, a normalized relative relevance is defined as 1-weight for each calculated delta. This further calculation results in the following (maximum) relative relevance values for each transmitter (in view of two deltas being generated for each): PN 1 (0.04), PN2 (0.99) and PN3 (0.0). As one would expect from visually inspecting FIG. 5, PN2 was the most relevant signal point value in this particular iteration of step 300. The other two (PN1 and PN3) are assigned a very low relevance in this particular iteration of step 300. These relative relevance values are thereafter stored for later processing (see step 320).

An interesting scenario for executing step 300 involves two, relatively weak, signal data point values are processed. Such case may arise at the border between two cells (e.g., two markets). Thus, in the case of two transmitter signal point values having a value of −13 dB, the normalized relevance of both week signals is 0.73—considerably higher than if no dB correction is applied (resulting in a relevance of 0.5)

With continued reference to FIG. 3, during step 310 the normalized quality value is generated for the signal value data point (e.g., one of the three PN values discussed herein above with reference to FIGS. 5-9. In accordance with the illustrative example, fuzzy logic analysis is applied to the signal value data point to render the normalized quality value (between 0 and 1—and generally comparable to the range of relevance values assigned to signal data points during step 300). Thus, a high "quality" signal data point (nearing a value of 1) is of high importance in the same way that a relatively highly "relevant" signal data point (nearing a value of 1) is also of high importance. This parallel relationship is important in the performance of step 320 where the normalized "relevance" and "quality" values are compared to render the "importance" value for the signal data point.

With continued reference to step 310, a fuzzy logic analysis is performed to render the normalized quality value for the signal data point value because an absolute value (e.g., −12 dB) is considered high/medium/low quality based upon context as well as the particular observer. Thus, instead of converting a raw value (e.g., −12 dB) into a single set membership (a value of "1" assigned to the set of choices: high, medium and low quality), the raw value can be a "partial" member in multiple sets. In the illustrative example discussed herein, the total of the membership values of any given point sum to "1." Moreover, fuzzy logic is applied to the signal data point according to the following rules:

IF SignalQuality is STRONG then weight is HIGH
IF SignalQuality is FAIR then weight is MEDIUM
IF SignalQuality is WEAK then weight is LOW
STRONG, FAIR, WEAK, HIGH, MEDIUM, and LOW are Fuzzy Sets which are defined using an "expert" criteria established by a radio network optimization engineer, and can be modified over time based upon experience. An example of a simple fuzzy logic inference engine is described herein below with reference to FIG. 10.

Figure 10:
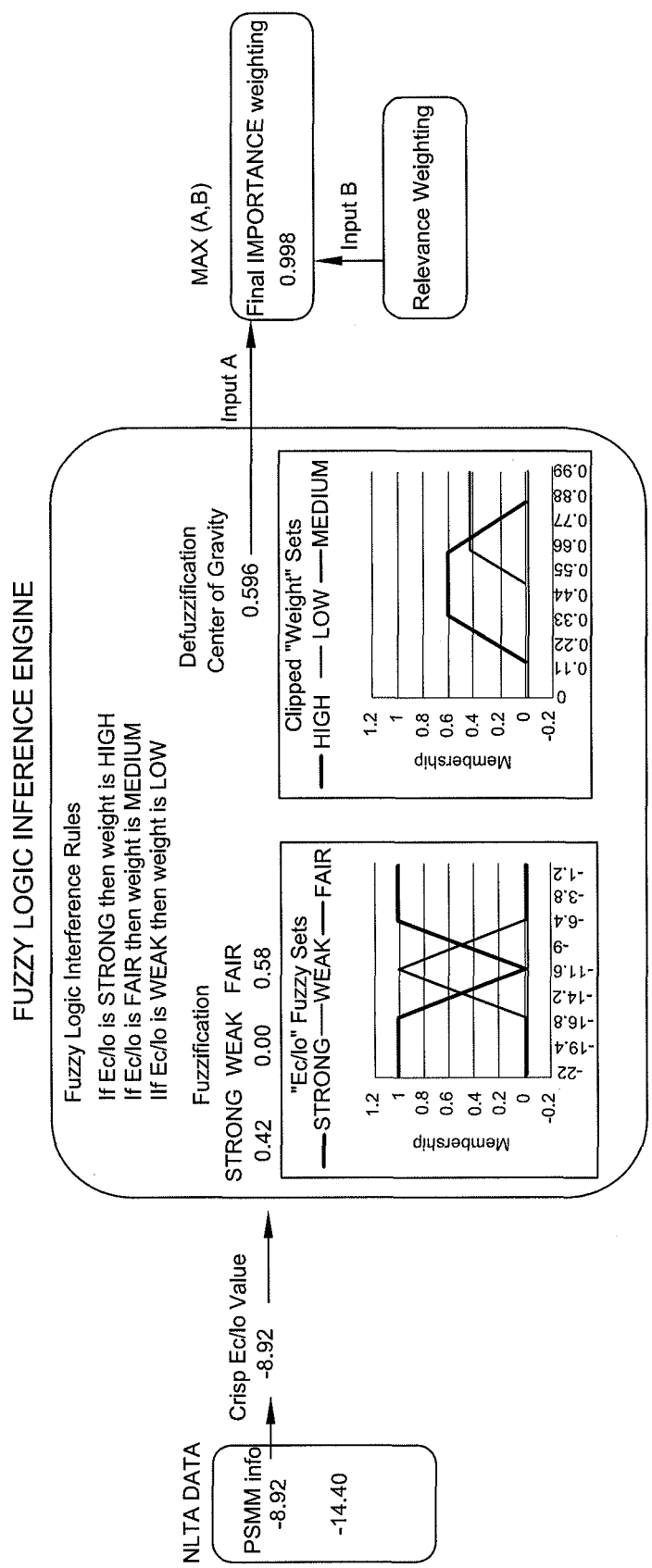
FIG. 10 summarizes the operation of a fuzzy logic engine and subsequent MAX function applied to normalized relative relevance and quality values for a signal data point to render a normalized importance value for the signal data point.

Turning to FIG. 10, an exemplary fuzzy logic engine is represented by two stages: a fuzzification stage and a defuzzification stage. The fuzzification stage, summarized in a first graph in FIG. 10, converts a crisp input signal data point (e.g., −8.92 dB) into a set of degree of membership values (e.g., weak: 0.0, fair: 0.58, and strong: 0.42). Taking a closer look at the fuzzy set membership definitions (provided in FIG. 10 as an example), the horizontal axis represents the universe of discourse—i.e., the range of all possible values applicable to the crisp value variable. The range depicted in FIG. 10 includes sub-ranges where a particular crisp value is a member in two groups (e.g., strong/fair groups or fair/weak groups) as well as areas where the crisp value belongs to only a single group (e.g., −20 dB only weak).

The vertical axis represents the degree of membership value of the input crisp value in one of the fuzzy sets. In the present case, the dB value for the signal data point (e.g., Ec/Io) is mapped to degrees of membership in the "strong", "fair" and "weak" groups. Though not required, in the illustrative example, for any value, the sum of the degrees of membership equals 1. In the present example the variable, for which a crisp value of −8.92 dB is provided, the degree of membership is 0.42 in the "strong" signal group and 0.58 in the "fair" signal group. Thus, the value of −8.92 is more associated with the "fair" group than the "strong" group. This observation affects the strength of "implication" (clipping "membership" values) when determining a center of gravity (normalized output importance value) during the defuzzification stage.

The defuzzification stage, summarized in a second graph in FIG. 10, takes the strong, fair and weak degrees of membership determined during fuzzification, and generates a center of gravity along an x-axis of the defuzzification graph depicted in FIG. 10. The center of gravity corresponds to the normalized quality of the signal data point for which a relative relevance was determined during step 300. The horizontal axis represents the range of quality values (0 to 1), and the vertical axis represents degree of membership (used to perform clipping in accordance with the degree of membership values established during the fuzzification stage. Thus, the triangle shape of the fair group is "clipped" at a value of 0.58 in accordance with the determination of that degree of membership of the crisp Ec/Io value during the fuzzification stage. Similarly, the waveform for the "strong" group is clipped at a value of 0.42. Thereafter, the center of gravity along the horizontal axis is determined in accordance with the clipped graph forms for the groups to which the value belongs (i.e., the point where the summed area under the two clipped graphs is equal to the left/right of a value along the horizontal axis. The center of gravity is the normalized quality value for the signal data point.

With continued reference to FIG. 10, during step 320 (of FIG. 3) a normalized relative importance value for the signal data point, for which the normalized relative relevance and the normalized quality values are determined during steps 300 and 310, is determined by comparing the normalized relative importance value and the normalized quality value and taking the larger of the two values. In the illustrative example, a MAX function on the values rendered during step 300 (e.g., 0.998) and step 310 (e.g., 0.596) results in an output normalized importance value of 0.998 for the signal data point. The output normalized importance value is stored and aggregated with other calculated normalized importance values for the same transmitter interface for subsequent binning and profile pattern classification in accordance with a histogram-based analysis relating particular histogram profile patterns to a need to take a remedial action for an improperly configured (e.g., over-reaching) transmitter/sector.

Figure 11:
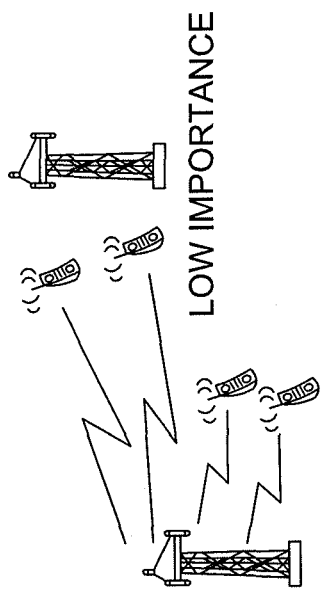
FIG. 11 illustratively depicts applying the relative importance metric to mobile wireless device positioning in a radio network.

Turning to FIG. 4A, a set of steps are summarized for carrying out the histogram-based analysis of aggregated normalized relative importance values for a particular transmitter/sector to detect a transmitter/sector configuration error. An example of such a configuration error is an "over-reaching" configuration, depicted in FIG. 11, wherein the transmitter/sector of interest is transmitting a signal too far, resulting in reaching mobile wireless devices at locations that are already well-covered by other transmitters/sectors. Over-reaching is characterized by an undesirably large percentage of signal data points having low relative importance—indicating that the particular transmitter/sector is reaching too far.

Initially, during step 400, a set of relative importance values is aggregated and stored based upon a multitude of signal data points provided, by mobile wireless devices, for the mobile wireless transmitter/sector corresponding to the signal data point. It is not generally essential to know the actual location where various signal data points were collected by a mobile wireless device if a statistically significant large number of signal data points are acquired for the transmitter/sector of interest. However, it is important to take a very large number of samples to ensure a relatively evenly geographically distributed set of signal data points since unequal distribution of locations where signal data points are collected can affect a shape of a resulting histogram. Therefore, in illustrative embodiments, an effort can be made to fill sample sets based upon location information provided by the mobile wireless devices along with signal data point.

Figure 12:
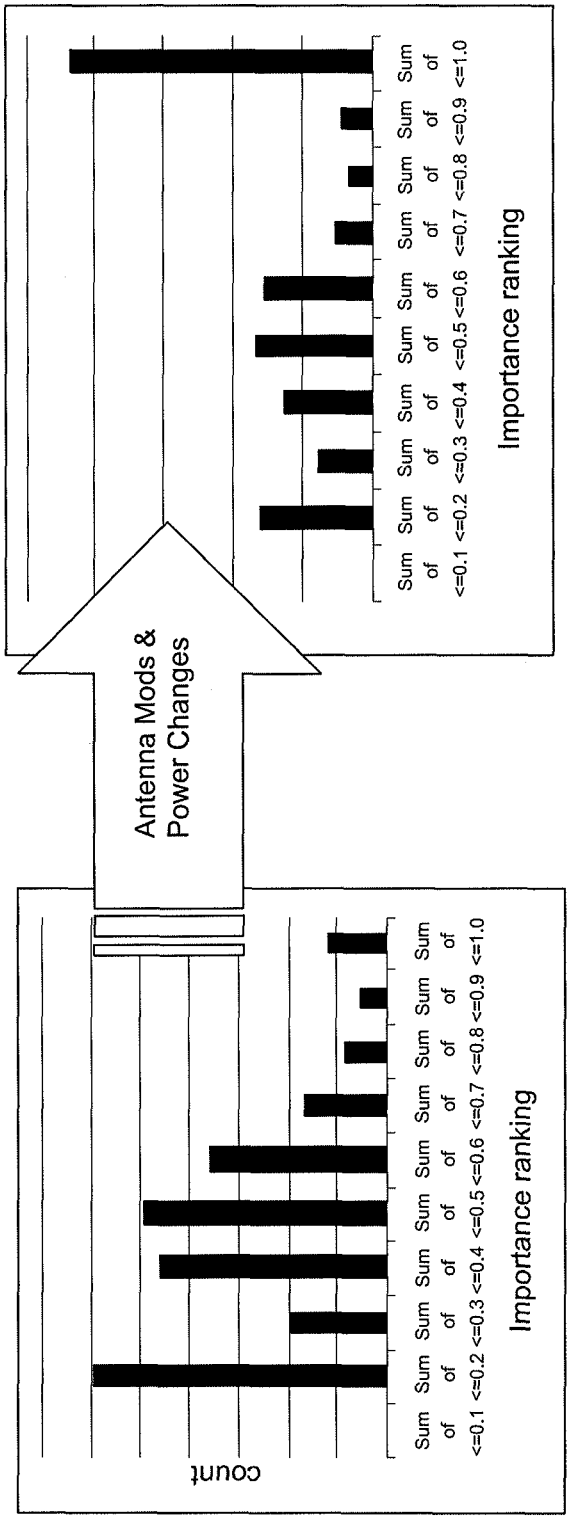
FIG. 12 comprises two histograms depicting importance data point concentrations for a transmitter/sector exhibiting "over-reaching" and "normal" signal importance patterns.

During step 410 the set of importance values aggregated during step 400 are arranged in set of bins corresponding to equally divided ranges of value for the normalized relative importance values generated in accordance with the steps of FIG. 3. The resulting binning is depicted in a histogram such as the ones depicted in FIG. 12.

Once the histograms are created, during step 420 a radio network interface optimization engineer, or alternatively a pattern recognition system, renders maintenance directions for modifying an operational state (e.g., transmitter power level) to correct operational configurations of transmitters/sectors whose patterns indicate improper configuration. For example, a histogram having a profile of the type depicted on the left side of FIG. 12 having a high concentration of "low importance" counts (relative importance values generally closer to zero), indicates an over-reaching transmitter configuration error. The over-reaching (or alternatively under-reaching) configuration error is addressed by using power/antenna configuration changes, incorporated into a closed-loop controller exercising supervisory control over the radio interface of the mobile wireless network, that will alter the histogram until it becomes a more balanced one such as the one depicted on the right side of FIG. 12.

Turning to FIG. 4B, a set of steps are summarized for generating a ranking of potential hand-off partners for a transmitter/sector of interest based upon the normalized relative importance values generated according to the method summarized in FIG. 3. Initially, during step 450, for the transmitter/sector of interest, a set of relative importance value sums are calculated for a set of neighboring transmitters. Such relative importance value sums are calculated from relative importance values calculated for signal data points derived from messages wherein the transmitter/sector of interest is identified as the reference transmitter/sector. The relative importance values are derived from signal data points derived from messages bearing signal-to-noise information and including the transmitter/sector of interest as the reference transmitter/sector.

Thereafter, during step 460 the sums of neighboring transmitters are ranked to establish a listing of hand-off partners for the transmitter/sector of interest.

The following illustrative example is used to show an example of the method depicted in FIG. 4B. As noted above, the output of the method summarized in FIG. 3 is a maximum of relative relevance and quality values for a signal data point, of a neighbor transmitter/sector, is assigned to the transmitter/sector pair (reference, neighbor) instead of merely a sector alone (binned data) as is the case with the method summarized in FIG. 4A.

A single set of data points are processed for a set of four transmitters: A, B, C, D, where transmitter A is a reference transmitter and the transmitter of interest for purposes of ranking hand-off partners from the reference transmitter to a neighboring transmitter. Initially calculate (relevance, quality)=>importance for all transmitters:

Since the reference transmitter is A, Assign weights only to pairs:

Weight (A,B)=importance (B)

Weight (A,C)=importance (C)

Weight (A,D)=importance (D)

The importance of A, the transmitter of interest, is not used. The importance values are accumulated (summed) across messages for all same pair combination.

An exemplary final sum for the identified reference transmitter (A) set would be, for example:

| Pair | Weight |
|------|--------|
| A-B  | 345.7  |
| A-C  | 205.4  |
| A-D  | 103.5  |

Additional information regarding reference transmitters and hand-off neighbor list ranking for a transmitter of interest is provided in Vela, et al., U.S. Pat. No. 8,086,237.

The steps of FIGS. 4A and 4B are carried out across all the relevant transmitters/sectors in a system to ensure that radio transmitter configuration errors are identified and corrected quickly, a task that would otherwise appear to be very difficult to accomplish without the above-discussed automated process/procedures. Moreover, the identification and remediation of correctable transmittal signal conditions leading to undesirable operating conditions within the radio interface of mobile wireless networks is fully automated in illustrative examples. In such instances the correctable signal condition for the first transmitter is corrected by issuing, by a programmed closed loop controller, a remedial command to a power level controller for the transmitter.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein known to the inventors for carrying out the invention. Variations of these embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method, implemented on a computer system, for identifying and carrying out reconfiguration actions for a transmitter in a radio network, the method comprising:
   determining, for a first transmitter, a multitude of relative importance values for signal data points relating to the first transmitter, the signal data points being acquired by mobile wireless devices from the first transmitter, each relative importance value being determined by:
      calculating a relative relevance for a first signal data point for the first transmitter, acquired by a first mobile wireless device, by comparing a first value for the first signal data point to a second value for a second signal data point for a second transmitter, where the first value and the second value are acquired by the mobile wireless device at a same location,
      calculating, by a fuzzy logic engine, a quality for the first signal data point, and
      rendering a relative importance value based upon the relative relevance and the quality for the first signal data point; and
   carrying out a reconfiguration action upon at least one transmitter based upon the multitude of relative importance values.

2. The method of claim 1 further comprising:
   binning the multitude of relative importance values to render a set of count values for individual ones of the multitude of relative importance values within sub-ranges of potential relative importance values; and
   identifying a correctable signal condition for the first transmitter, the identifying comprising applying a histogram profile pattern definition corresponding to the correctable signal condition to the set of count values rendered by the binning.

3. The method of claim 2 wherein the transmitter corresponds to a sector of a cellular network base station.

4. The method of claim 2 wherein rendering the relative importance value comprises apply a maximum value function upon normalized values for both the relative relevance and the quality for the first signal data point.

5. The method of claim 2 wherein the relative relevance is a normalized relative relevance value that is determined by applying a logit function to a difference value arising from the comparing the first value for the first signal data point to the second value for a second transmitter.

6. The method of claim 2 wherein calculating the relative relevance for the first signal data point includes applying a correction value, based upon a number of transmitters simultaneously sensed by the first mobile wireless device at a time of receiving the first signal data point, to a delta value arising from comparing the first value to the second value,
   wherein the correction value increases the relative relevance for the first signal data point as the number of transmitters decreases from a maximum correction transmitter number to a minimum transmitter number of two transmitters.

7. The method of claim 6 wherein the maximum correction transmitter number for which the correction value modifies the relative relevance is five transmitters.

8. The method of claim 2 wherein the signal data points relating to the first transmitter are signal-to-noise ratio data points.

9. The method of claim 2 wherein the signal data point is acquired by analysis of a message from the transmitter bearing signal-to-noise information, the message being of a type taking from the group consisting of: a Pilot Strength Message provided in CDMA networks; a Route Update Message provided in EV-DO networks; and a Measurement Report Message provided in LTE networks.

10. The method of claim 2 wherein the correctable signal condition for the first transmitter is an over-reaching condition in the transmitter.

11. The method of claim 2 wherein the correctable signal condition for the first transmitter is an under-reaching condition in the transmitter.

12. The method of claim 2 wherein the correctable signal condition for the first transmitter is corrected by issuing, by a programmed closed loop controller, a remedial command to a power level controller for the transmitter.

13. The method of claim 1 wherein the signal data points are derived from messages including a reference transmitter, the reference transmitter being a transmitter of interest and having a plurality of neighboring transmitters for which a hand-off list is maintained for the transmitter of interest, the method further comprising:
  summing the multitude of relative importance values to render a set of relative importance value sums, each sum corresponding to one of the plurality of neighboring transmitters enumerated in the hand-off list for the transmitter of interest, and
  wherein individual ones of the relative importance values used to create the relative importance value sums is assigned based upon relative importance values calculated for signal data points derived from messages wherein the transmitter/sector of interest is identified as the reference transmitter/sector.

14. The method of claim 13 further comprising:
  configuring a rank order listing of the set of relative importance value sums based upon their value, the rank order listing being used to establish a preferred hand-off partner for the transmitter of interest.

15. The method of claim 1 where the first value and the second value are acquired by the mobile wireless device at a same point in time.

16. A non-transitory computer-readable medium including computer executable instructions for identifying and carrying out reconfiguration actions for a transmitter in a radio network, the computer-executable being executed on a computer system to facilitate performing the steps of:
  determining, for a first transmitter, a multitude of relative importance values for signal data points relating to the first transmitter, the signal data points being acquired by mobile wireless devices from the first transmitter, each relative importance value being determined by:
    calculating a relative relevance for a first signal data point for the first transmitter, acquired by a first mobile wireless device, by comparing a first value for the first signal data point to a second value for a second signal data point for a second transmitter, where the first value and the second value are acquired by the mobile wireless device at a same location,
    calculating, by a fuzzy logic engine, a quality for the first signal data point, and
    rendering a relative importance value based upon the relative relevance and the quality for the first signal data point; and
  carrying out a reconfiguration action upon at least one transmitter based upon the multitude of relative importance values.

17. The non-transitory computer-readable medium of claim 16 further comprising computer-executable instructions for:
  binning the multitude of relative importance values to render a set of count values for individual ones of the multitude of relative importance values within sub-ranges of potential relative importance values; and
  identifying a correctable signal condition for the first transmitter, the identifying comprising applying a histogram profile pattern definition corresponding to the correctable signal condition to the set of count values rendered by the binning.

18. The non-transitory computer-readable medium of claim 16 wherein the signal data points are derived from messages including a reference transmitter, the reference transmitter being a transmitter of interest and having a plurality of neighboring transmitters for which a hand-off list is maintained for the transmitter of interest, the computer-executable instructions further comprising instructions executed on the computer system to facilitate performing the steps of:
  summing the multitude of relative importance values to render a set of relative importance value sums, each sum corresponding to one of the plurality of neighboring transmitters enumerated in the hand-off list for the transmitter of interest, wherein individual ones of the relative importance values used to create the relative importance value sums is assigned based upon relative importance values calculated for signal data points derived from messages wherein the transmitter/sector of interest is identified as the reference transmitter/sector; and
  configuring a rank order listing of the set of relative importance value sums based upon their value, the rank order listing being used to establish a preferred hand-off partner for the transmitter of interest.

19. The non-transitory computer-readable medium of claim 16 where the first value and the second value are acquired by the mobile wireless device at a same point in time.

20. A computer system including:
  a processor; and
  a non-transitory computer-readable medium including computer executable instructions for identifying and carrying out reconfiguration actions for a transmitter in a radio network, the computer-executable being executed on the processor of the computer system to facilitate performing the steps of:
    determining, for a first transmitter, a multitude of relative importance values for signal data points relating to the first transmitter, the signal data points being acquired by mobile wireless devices from the first transmitter, each relative importance value being determined by:
      calculating a relative relevance for a first signal data point for the first transmitter, acquired by a first mobile wireless device, by comparing a first value for the first signal data point to a second value for a second signal data point for a second transmitter, where the first value and the second value are acquired by the mobile wireless device at a same location,
      calculating, by a fuzzy logic engine, a quality for the first signal data point, and
      rendering a relative importance value based upon the relative relevance and the quality for the first signal data point; and
    carrying out a reconfiguration action upon at least one transmitter based upon the multitude of relative importance values.

21. The computer system of claim 20 wherein the non-transitory computer-readable medium further comprises computer-executable instructions for:

binning the multitude of relative importance values to render a set of count values for individual ones of the multitude of relative importance values within sub-ranges of potential relative importance values; and identifying a correctable signal condition for the first transmitter, the identifying comprising applying a histogram profile pattern definition corresponding to the correctable signal condition to the set of count values rendered by the binning.

22. The computer system of claim 20 wherein the signal data points are derived from messages including a reference transmitter, the reference transmitter being a transmitter of interest and having a plurality of neighboring transmitters for which a hand-off list is maintained for the transmitter of interest, the computer-executable instructions further comprising instructions executed on the computer system to facilitate performing the steps of:

summing the multitude of relative importance values to render a set of relative importance value sums, each sum corresponding to one of the plurality of neighboring transmitters enumerated in the hand-off list for the transmitter of interest, wherein individual ones of the relative importance values used to create the relative importance value sums is assigned based upon relative importance values calculated for signal data points derived from messages wherein the transmitter/sector of interest is identified as the reference transmitter/sector; and configuring a rank order listing of the set of relative importance value sums based upon their value, the rank order listing being used to establish a preferred hand-off partner for the transmitter of interest.

23. The system of claim 20 where the first value and the second value are acquired by the mobile wireless device at a same point in time.

* * * * *